United States Patent [19]

Vanderstukken

[11] Patent Number: 5,244,709
[45] Date of Patent: Sep. 14, 1993

[54] FIRE SCREENING, LIGHT-TRANSMITTING PANELS WITH INTUMESCENT MATERIAL AND EXPOSED CONNECTION SURFACES

[75] Inventor: Robert Vanderstukken, Ransart, Belgium

[73] Assignee: Glaverbel, Brussels, Belgium

[21] Appl. No.: 626,700

[22] Filed: Dec. 13, 1990

[30] Foreign Application Priority Data

Dec. 23, 1989 [GB] United Kingdom ............... 8929164

[51] Int. Cl.$^5$ .......................... B32B 17/06; B32B 3/06
[52] U.S. Cl. ...................................... 428/99; 428/34;
428/38; 428/920; 428/921; 428/189; 428/157;
428/81; 428/138; 428/410; 428/428; 428/212;
428/213; 428/214; 52/171; 52/789; 52/232;
156/101; 49/501; 49/503; 206/321; 206/325
[58] Field of Search .................. 428/34, 38, 920, 921,
428/189, 157, 81, 99, 138, 192, 410, 428, 212,
213, 214; 52/171, 789, 232; 156/101; 49/301,
503; 206/321, 325

[56] References Cited

U.S. PATENT DOCUMENTS

| | | | |
|---|---|---|---|
| 2,326,203 | 8/1943 | Dennison | 52/789 |
| 2,401,552 | 6/1946 | Cox | 52/789 |
| 2,659,686 | 11/1953 | Watkins | 52/789 |
| 4,046,933 | 9/1977 | Stefanik | 52/789 |
| 4,081,581 | 3/1978 | Littell, Jr. | 52/789 |
| 4,104,427 | 8/1978 | Nolte et al. | 428/189 |
| 4,444,825 | 4/1984 | Vanderstukken | 428/428 |
| 4,582,738 | 4/1986 | Kunert | 428/157 |
| 4,621,001 | 11/1986 | Bard | 428/189 |

FOREIGN PATENT DOCUMENTS

| | | |
|---|---|---|
| 0136064 | 4/1985 | European Pat. Off. |
| 8528920 | 2/1986 | Fed. Rep. of Germany |
| 2532300 | 3/1984 | France |
| 1451931 | 10/1976 | United Kingdom |
| 2023452 | 1/1980 | United Kingdom |
| 1590837 | 6/1981 | United Kingdom |
| 2096944 | 10/1982 | United Kingdom |
| 2116243 | 9/1983 | United Kingdom |
| 2199535 | 7/1988 | United Kingdom |

Primary Examiner—Ellis P. Robinson
Assistant Examiner—William P. Watkins
Attorney, Agent, or Firm—Spencer, Frank & Schneider

[57] ABSTRACT

A light-transmitting fire resistant glazing panel includes at least two vitreous sheets between which is sandwiched at least one intervening layer of intumescent material, for example, of hydrated sodium silicate. Two of the vitreous sheets are of different thicknesses and they are bonded together via the sandwiched intumescent material. The thinner of the two vitreous sheets is of conforming size to the thicker sheet and the thinner sheet and intumescent layer are shaped to leave the main face of the thicker sheet to which they are bonded exposed at a plurality of local marginal areas. This allows a hinge bracket 11 to be attached to the thicker sheet 1 at the exposed area 5 by a plurality of bolts leading through holes in the thicker sheet. The bolts may comprise sheathes, e.g. of nylon, or they may lead through bushes, e.g. of nylon, to avoid direct contact between the metal of the bolts and the glass if this is desired. The re-entrants in the thinner sheets over the exposed areas of the thicker sheet are then optionally filled with a pre-formed member of fire retardant material such as that available under the Trade Name PALUSOL, and a finishing mask.

9 Claims, 1 Drawing Sheet

FIRE SCREENING, LIGHT-TRANSMITTING PANELS WITH INTUMESCENT MATERIAL AND EXPOSED CONNECTION SURFACES

BACKGROUND OF THE INVENTION

1. Field of the Invention

This invention relates to light-transmitting fire resistant glazing panels of the type which comprises at least two vitreous sheets between which is sandwiched at least one intervening layer of intumescent material.

2. Description of the Related Art

There is a demand for such panels to afford a degree of personal protection in the event of a fire, and to delay the spread of the fire. On the exposure of the panel to the intense heat of a fire, the intumescent material, which is typically a hydrated alkali metal silicate, most often sodium silicate, foams and becomes opaque. It thus forms a barrier against the transmission of infra red radiation. Furthermore, in the event that one sheet, or even more, of the panel becomes broken due to thermal shock, such foamed intumescent material can be effective to maintain the fragments in position, so that the pan remains effective as a barrier against the passage of smoke and fumes.

Known panels of the type referred to are framed and may be secured in place by their frames in for example a window opening, or as transparent panels within a door.

SUMMARY OF THE INVENTION

It is an object of the present invention to provide a panel of the type referred to which does not require framing, and which can accordingly present a high light transmitting area in relation to the total area of the panel.

According to the present invention, there is provided a light-transmitting fire resistant glazing panel which comprises at least two vitreous sheets between which is sandwiched at least one intervening layer of intumescent material, characterised in that two said vitreous sheets are of different thicknesses and are bonded together via said sandwiched intumescent material, the thinner of said two vitreous sheets is of conforming size to the thicker sheet and the thinner sheet and intumescent layer are shaped to leave the main face of the said thicker sheet to which they are bonded exposed at a plurality of local marginal areas.

Such a panel can readily be held in position by clamping the thicker sheet thereof at its exposed areas. It will be appreciated that the number of such exposed areas, and their disposition around the periphery of the panel may easily be adapted to different holding requirements.

A particular advantage of embodiments of the present invention is that it avoids the necessity to subject the sandwiched intumescent material to compressive clamping forces by the means which holds the panel in position. This is not so important when it is desired to use a continuous marginal frame for the panel, since the clamping forces may then be well distributed around the entire margin of the panel. But when it is desired to use only local clamping means, the clamping forces must of necessity be that much higher, and if the entire thickness of the panel were to be locally clamped, the clamping forces could well be high enough to cause creep of the relatively malleable intumescent material which would induce significant bending stresses into the sandwiching sheets of vitreous material and could easily lead to breakage. This situation may be avoided by the adoption of the present invention, since the thicker sheet of the panel may be clamped alone, solely at those areas where both its main faces are exposed.

The vitreous material used is suitably glass. The glass used may be of a heat-resistant type, for example a borosilicate glass, or another glass as for example described in British Patent Specification No. 2,096,944. The thicker vitreous sheet may for example be 6 mm to 15 mm in thickness, depending on the size and shape of the panel. The thinner vitreous sheet may be 2 mm to 6 mm in thickness. The thicker sheet is preferably at least twice as thick as the thinner sheet, and optimally it constitutes at least half the thickness of the panel. In the case of rather large panels, for example panels measuring 1 meter by 2.2 meters which may be used as doors, it is suitable to make the thicker sheet 8 mm to 12 mm thick while the thinner sheet is 3 mm to 4 mm thick.

The intumescent material used may be any of various hydrated metal salts which can be sandwiched to form a transparent panel. Various examples of such materials are set out in British Patent Specification No. 1,451,931. For reasons of cost and ease of forming transparent interlayers, hydrated sodium silicate is preferred. The sandwiched intumescent layer may be formed to a thickness of for example 0.5 mm to 5 mm, according to the degree of fire resistance required for any particular installation. A thickness in the range 1.2 mm to 2.5 mm is preferred for the or each layer of intumescent material. In general, transparency, and the maintenance of that transparency over the course of time, are promoted by the use of intumescent layers up to 2 mm thick.

A convenient method of manufacturing such a panel is to form a layer of the intumescent material on the thinner vitreous sheet, and then to laminate that coated sheet to the thicker vitreous sheet, optionally using an intervening film of adhesive material such as polyvinyl butyral. A classical laminating technique may be used, provided that care is taken to ensure that the temperature and pressure conditions to which the intumescent material is subjected during lamination do not cause premature intumescence.

If that thinner vitreous sheet is a sheet of tempered glass, it must be cut to size and shape before tempering, and the intumescent layer must be formed after tempering. If that sheet is not tempered, it is convenient to cut it to shape after the layer of intumescent material has been formed thereon.

In some preferred embodiments of the invention, a second thinner vitreous sheet is bonded to the other main face of the said thicker sheet via a second layer of intumescent material, such second thinner vitreous sheet and such second layer being of substantially identical shape to the first thinner sheet and layer respectively, whereby both main faces of the said thicker sheet are left exposed at a plurality of local marginal areas which are in register as between one main face and the other. This augments the fire resistance of the panel, and for a given fire resistance, it allows a higher degree of transparency to be more easily maintained over the course of time. The reason for this is that it is easier to form layers of intumescent material which maintain their transparency over the course of time if those layers are thin. Thus two separate layers each say 1 mm thick may more easily be formed to maintain a given degree of transparency over the course of time than a single layer 2 mm in thickness.

Such second thinner vitreous sheet may be made identical to the first, and it may be bonded to the thicker sheet in the same way, indeed in the same step.

Advantageously, said thicker sheet is pierced by at least one hole at each of said exposed areas. Such holes facilitate the fixing of various kinds of attachment to the panel, for example using bolts leading through the thicker sheet. Where such an attachment is to be fitted to the thicker sheet, the adoption of the invention affords the further advantage of facilitating manufacture. If such an attachment were to be bolted through the entire thickness of the panel, it would be necessary either to ensure accurate registration in the assembled panel of predrilled holes, or it would be necessary to drill through the entire thickness of the panel after bonding. The former would require additional accurate drilling steps, and the latter could subject the panel to undesirable stresses which might lead to disturbance of the intumescent material and even breakage unless performed in a very careful manner. Both these disadvantages are avoided by the adoption of such preferred embodiments of the invention.

Preferably, there are said exposed areas of the thicker sheet located at opposite side margins thereof. For example the panel might have two such exposed areas for the fixing of attachments which define a pivot axis for the panel.

In order to promote the mechanical resistance of the panel, it is preferred that at least the thicker vitreous sheet is subjected to a strengthening treatment prior to bonding thereto of the or a said thinner sheet. Such a treatment could be merely a thermal toughening treatment, but it is more preferably a thermal or chemical tempering treatment. In view of the thicknesses of the various sheets of the panel, it is convenient to subject the thicker sheet to a thermal tempering treatment. If the thinner sheet or sheets is or are to be strengthened, then a chemical tempering treatment is preferred.

In preferred embodiments of the invention, there are at least two said exposed areas of the thicker sheet located along a straight side margin thereof and there is a further said exposed area located in the median third of the length of an opposite side margin thereof. For example hinge attachments may be fitted to exposed areas of the thicker sheet at one side of the panel, while a handle or other attachment is fitted at the other side of the panel. Such a handle or other attachment may if desired incorporate latching or locking means. If the panel were constituted as a door, such as a swing door, a push bar might be provided extending across each face, such bars being fixed to the door at opposite side margins thereof.

The invention includes a kit comprising a panel as herein defined, together with a member of fire-retardant material shaped to fit into a re-entrant of a said thinner sheet over each exposed area of the thicker sheet. Such a fire retardant member will help to protect the exposed area of the thicker sheet against thermal shock on the outbreak of fire. Alternatively, or in addition, such a kit may include a plurality of hinges and/or handle means for attachment to the panel.

BRIEF DESCRIPTION OF THE DRAWINGS

A preferred embodiment of the invention will now be described with reference to the accompanying diagrammatic drawings in which.

DESCRIPTION OF THE PREFERRED EMBODIMENTS

Figure 1:
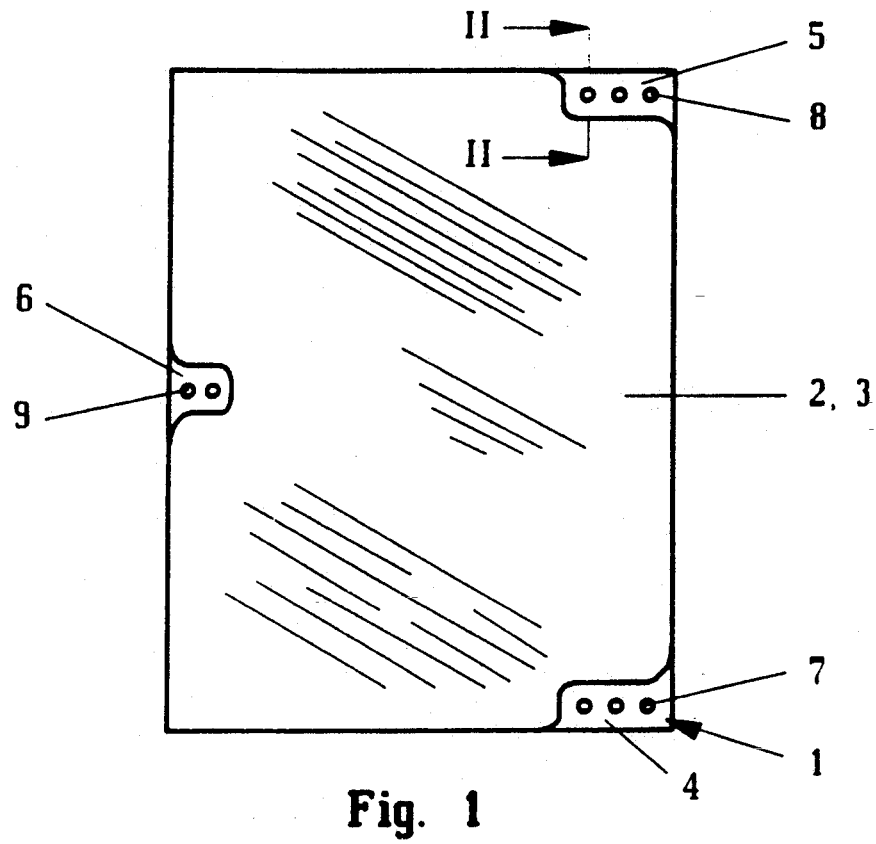
FIG. 1 is an elevation of a panel according to the invention.

In order to form a fire screening light transmitting door panel, three rectangular glass sheets are cut to size and shape. In one particular embodiment, one of these sheets (indicated by reference numeral 1) is 10 mm in thickness, and the other two sheets (indicated by reference numerals 2 and 3) are each 3 mm in thickness. As will be seen from FIG. 1, re-entrants are cut in a thinner sheet 2 (the other thinner sheet 3 is identical) at the corners at opposite ends of one side margin and in the median third of the opposite side margin to leave local marginal areas 4, 5, 6 of both main faces of the thicker sheet 1 exposed. The areas 4, 5, 6 of the thicker sheet 1 which are to be exposed in the finished panel are drilled to provide holes 7, 8, 9.

After cutting and drilling, the various sheets of the panel are subjected to any desired strengthening treatment. The thicker sheet 1 may be thermally tempered. Since the thinner sheets 2, 3 are only 3 mm thick in this example, if they are to be strengthened, this is preferably done by chemical tempering.

The three glass sheets are then laid up together with intervening layers of intumescent material and the panel is bonded together in a manner known per se. The intumescent material (reference numeral 10 in FIG. 2) may be deposited as layers on faces of the two thinner sheets 2, 3, or it may take the form of two layers of largely granular material as described in patent specification GB 2 023 452. In either event it is suitable to use a temperature and pressure schedule as described in that specification, or in GB 1,590,837, for laminating the panel together. The preferred intumescent material is hydrated sodium silicate having a weight ratio of $SiO_2$:-$Na_2O$ of between 3.3:1 and 3.4:1, and it may contain a silicate stabilizing agent as described in British patent specification No GB 2 199 535. In this example, the intumescent material is deposited to form two layers each 1.5 mm thick in the finished panel.

The laminate is now ready for the attachment of required door fittings (not shown). Hinges are to be attached to the thicker sheet 1 at exposed areas 4 and 5, and a handle, optionaly incorporating a latching and/or locking mechanism, is to be attached at exposed area 6.

Figure 2:
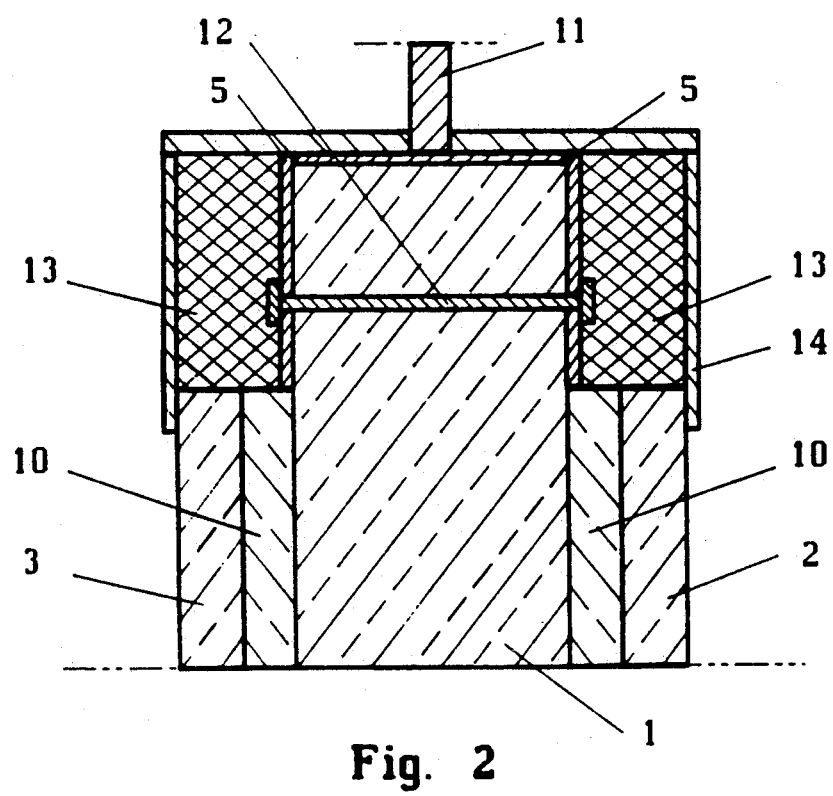
FIG. 2 is a detail cross section showing how an attachment may be fixed to that panel.

In FIG. 2, a hinge bracket 11 is attached to the thicker sheet 1 at exposed area 5 by a plurality of bolts such as 12 leading through the holes 8 (cf FIG. 1). The bolts may comprise sheathes e.g. of nylon, or they may lead through bushes e.g. of nylon to avoid direct contact between the metal of the bolts and the glass if this is desired. The re-entrants in the thinner sheets 2, 3 over the exposed areas 5 of the thicker sheet are then optionally filled with a pre-formed member 13 of fire retantdant material such as that available under the Trade Name PALUSOL, and a finishing mask 14.

In order to protect the or each intumescent interlayer against atmospheric attack, an edging member (not shown) may be provided for the panel. This may be done in various ways. For example, a groove may be formed around the edge of the panel by removing a marginal portion of the or each intumescent layer, and that groove could be filled with a suitable sealant, such as a silicone. Alternatively, a sealant border could be applied to a said thinner sheet prior to the formation of an intumescent layer on that sheet within that border. Or a channel member could be applied around the border of the panel. If made of wood or plastics such a channel member could conveniently be of square U-section. Alternatively, a composite channel could be made up of two L-sections of metal in such a manner as to avoid the creation of a thermally conductive bridge through the panel. In the case of a panel to be used as a door, it would be desirable to provide a channel member along the foot of the door to protect the door against mechanical damage. Such a channel member would also assist resistance against any tendency for relative slippage of the vitreous sheets of the panel following creep within an intumescent layer.

What is claimed is:

1. A light-transmitting, fire resistant glazing panel, comprising:
    at least two vitreous sheets and at least one intervening layer of intumescent material sandwiched between adjacent sheets of the at least two vitreous sheets,
    wherein two of the at least two vitreous sheets have different thicknesses to provide a thick sheet having opposing main faces, and a thin sheet, and are bonded together via the intumescent material sandwiched therebetween, the thin sheet of the two vitreous sheets having a size which conforms to that of the thick sheet, and the thin sheet and the intervening layer of intumescent material being shaped to leave the main face of the thick sheet to which they are bonded exposed at a plurality of local marginal areas, thereby defining a plurality of re-entrants, one re-entrant of the thin sheet over each exposed local marginal area of the thick sheet.

2. The panel according to claim 1, wherein three vitreous sheets and two intervening layers are provided including a second thin sheet which is bonded to the other main face of the thick sheet via a second intervening layer of intumescent material, the second thin sheet and the second intervening layer being of substantially identical shape to the first thin sheet and intervening layer respectively, whereby both opposing main faces of the thick sheet are left exposed at a plurality of local marginal areas which are in register as between one main face and the other.

3. The panel according to claim 1, wherein the thick sheet has defined therein at least one hole in each of the plurality of exposed local marginal areas.

4. The panel according to claim 1, wherein the thick sheet has opposing side margins and wherein exposed local marginal areas are located at opposing side margins thereof.

5. The panel according to claim 4, wherein the thick sheet has at least two exposed local marginal areas located along one of a pair of opposing side margins thereof and an exposed local marginal area located in the median third of the length of the other of the pair of opposing side margins.

6. The panel according to claim 1, wherein at least the thick sheet is subject to a strengthening treatment prior to bonding thereto of the thin sheet.

7. A kit, comprising:
    a light-transmitting, fire resistant glazing panel comprised of at least two vitreous sheets and at least one intervening layer of intumescent material sandwiched between adjacent sheets of the at least two vitreous sheets, wherein two of the at least two vitreous sheets have different thickness to provide a thick sheet having opposing main faces, and a thin sheet, and are bonded together via the intumescent material sandwiched therebetween, the thin sheet of the two vitreous sheets having a size which conforms to that of the thick sheet, and the thin sheet and the intervening layer of intumescent material being shaped to leave the main face of the thick sheet to which they are bonded exposed at a plurality of local marginal areas, thereby defining a plurality of re-entrants, one re-entrant of the thin sheet over each exposed local marginal area of the thick sheet; and
    a member made of fire-retardant material shaped to fit into each re-entrant of the plurality of re-entrants.

8. The kit according to claim 7, further comprising a plurality of hinge attachments for being fitted to the thick sheet at each of a plurality of exposed local marginal areas provided along one side margin thereof.

9. The kit according to claim 7, further comprising a handle for attachment to the thick sheet at an exposed local marginal area thereof.

* * * * *